June 4, 1968 DHU AINE J. DAVIS 3,387,244
TRANSFORMER HAVING WINDING LEADS HELD IN PRESSURE
CONTACT WITH TERMINALS
Filed May 3, 1966
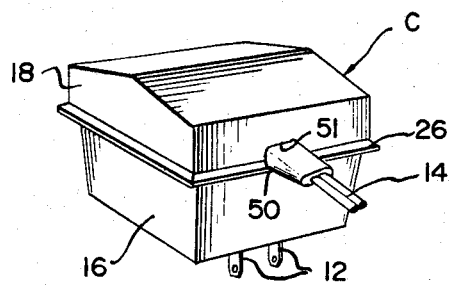
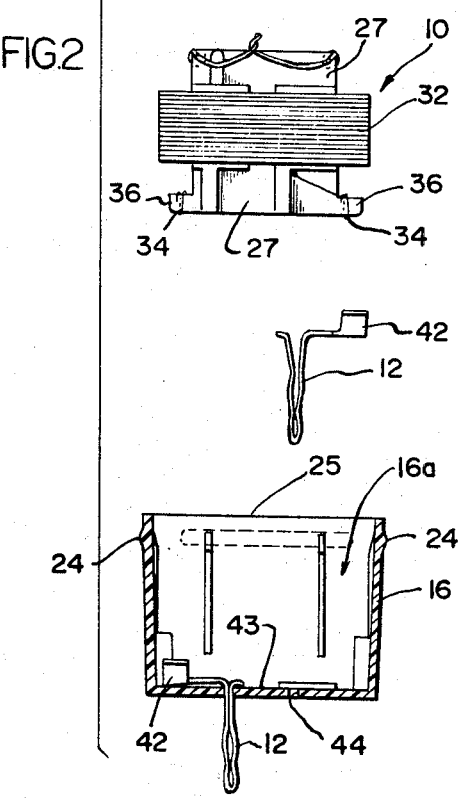
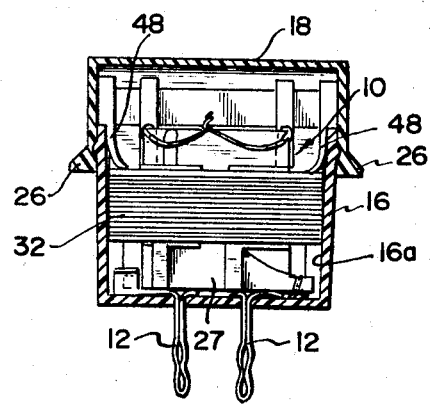
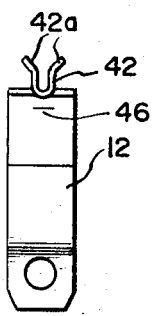
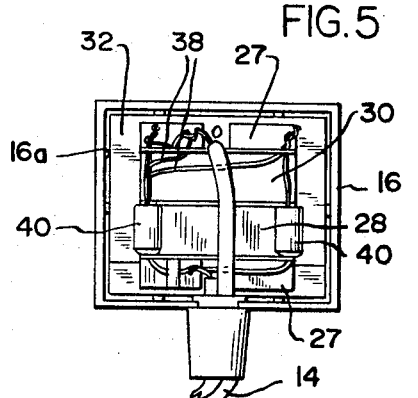
INVENTOR
DhuAine J. Davis
BY Hofgren, Wegner, Allen,
Stellman & McCord
ATTORNEYS

United States Patent Office 3,387,244
Patented June 4, 1968

---

3,387,244
TRANSFORMER HAVING WINDING LEADS HELD IN PRESSURE CONTACT WITH TERMINALS
Dhu Aine J. Davis, Wheaton, Ill., assignor to Hermetic Coil Co., Inc., a corporation of Connecticut
Filed May 3, 1966, Ser. No. 547,209
8 Claims. (Cl. 336—92)

ABSTRACT OF THE DISCLOSURE

An electrical converter in which a hollow casing has a pair of parallel slots therethrough for receiving a pair of input terminal arms and an opening for receiving an output transferring device. Each terminal arm has a lead receiving portion disposed within the casing. A transformer is fitted snugly in the interior of the casing and has primary winding means including input leads held in pressed contact with the lead receiving portions of the terminal arms and secondary winding means having output leads secured to the output transferring device. The casing includes a body member for receiving the transformer and a lid member snap fit onto the body member. The lid has resilient means engaging a portion of the transformer for maintaining pressure against the transformer to press the input leads against the lead receiving portions of the terminal arms.

---

This invention relates to an electrical device and more particularly to an electrical converter or like electrical translating means.

An electrical converter conventionally has a transformer housed within a casing and includes a primary winding having input leads and a secondary winding having output leads. A pair of input terminal arms are rigidly fixed to the casing by screws or other fastening means and extend outwardly through the casing. The input leads of the primary winding are usually soldered or screwed to the terminal arms. The output leads are secured to an electrical cord or to a terminal receiving socket extending through the casing. Should the converter change alternating current to direct current, diodes are also secured to the output leads and electrical cord, as by welding. The casing usually includes a hinged or screwed on lid. It can immediately be seen that these various component parts require tedious and costly assembly. Such electrical converters have become widely used as alternate power sources for battery operated electrical shavers and other similar electrical tools. They are similarly used to step down the current to charge the batteries of the many "portable" electrical devices presently on the market. There is a great demand for a compact and inexpensive converter of this character.

Therefore, it is the principal object of this invention to provide a compact, inexpensive, sturdy, and easily assembled electrical current converter.

Another object of the invention is to provide a means for completely assembling an electrical device of the character described without employing screws or other similar fastening means.

A further object of the invention is to provide a means for snugly mounting a transformer or other electrical translating means within a casing and holding the input leads of the transformer in pressed contact with a pair of terminal arms, without employing independent securing or fastening means.

More particularly, this invention relates to an electrical converter or like electrical translating device which includes a casing having an interior cavity and an opening for receiving an electrical cord. A pair of input terminal arms are snap fitted through a pair of spaced slots in the casing, each terminal arm having a lead receiving channel in the interior casing cavity. A transformer is fitted snugly in the cavity, and a lid portion of the casing is snapped onto the body portion of the casing to maintain pressure against the transformer to press the input leads against the lead receiving channels of the terminal arms, thereby providing a completely assembled electrical converter without employing a single screw or other similar fastening means.

Other features and advantages of the invention will readily be apparent from the following specification and from the drawings, in which:

FIGURE 1 is a perspective view of an electrical converter embodying the invention;

FIGURE 2 is an exploded view of the converter, illustrating the component parts thereof;

FIGURE 3 is a sectional view taken generally along the lines 3—3 of FIGURE 1;

FIGURE 4 is a side elevational view of one of the terminal arms; and

FIGURE 5 is a top plan view of the converter with the lid removed to facilitate the illustration.

Electrical translating devices of the type contemplated herein are used extensively in stepping down the current to charge batteries or stepping up the current to provide a D.C. power source for a wide variety of available electrical utensils. The improved construction disclosed and claimed herein can readily be adapted for these and many other applications. For instance, such electrical translating means as interference elimination filters for television sets can also be provided with the novel constructions which embody the invention.

Turning now to the drawings, an electrical converter is shown to comprise a casing C within which is housed a transformer 10 which has input leads (hereinafter described) secured to a pair of terminal arms 12 and output leads (hereinafter described) secured to an electrical cord 14 which extends through the casing. The casing includes a rectangularly cup-shaped body member 16 having an interior cavity 16a for receiving the transformer 10, and a lid member 18 snap fitted over the body member. The lid is provided with interior grooves 20, adjacent its lower marginal edge 22 and which snap over exterior locking lips 24 adjacent the upper marginal edge 25 of the body member 16. The lid can then be snapped over the body member whereby the lips 24 will lock in the grooves 20. The lid also includes an outer marginal gripping flange 26 which may be grasped by a person's fingers to unlock the lid from the body member. The lid and body member are preferably molded of plastic material to provide for sturdiness and good wear, while maintaining flexibility to permit the snap fit between the lid and the body.

The transformer generally includes a molded nylon bobbin 27 which is adapted to receive a primary or input coil 28 and a secondary or output coil 30. An E-bar core 32 embraces the bobbin 27 about the primary and secondary coils, with the center leg of the E extending through the coils in a known manner. The primary windings of the input coil 28 have input leads 34 (FIG. 2) which are wrapped around two vertically disposed arms 36 which are molded integrally with the bobbin 27. The secondary windings of the output coil have leads 38 which are welded to the leads of the electrical cord 14 (FIG. 5) and/or diodes 40. Two diodes 40 are included in the embodiment illustrated to convert the alternating current to direct current.

Terminal leads 12 are performed out of metal and include a lead receiving portion 42 in the form of an upwardly facing channel extending transversely away from the body of the terminal arm and having outwardly flared legs 42a (FIG. 4). The channel receiving portion 42 bears against the bottom wall 43 of the interior cavity. The flared legs 42a guide the bobbin arms 36 and the input leads 34 wrapped thereabout into the channel 42. A pair of such preformed terminal arms are snap fitted through a pair of spaced generally parallel slots 44 (FIG. 2) in the casing body member 16 from the interior of the casing so that the lead receiving channels face upwardly within the interior cavity 16a of the casing. The terminal arms are provided with tabs 46 (FIG. 4) which snap through the slots 44 of the casing and bear against the underside of the casing to hold the terminal arms in place. The transformer 10 is fitted snugly in the interior cavity 16a of the casing body member 16 such that the input leads 34 wrapped around bobbin arms 36 are held in pressed contact with the lead receiving channels 42 of the terminal arms.

A plurality of resilient fingers 48 (FIG. 3) are molded integrally to the interior side walls of the lid 18 and engage the upper surface of the laminated core of the transformer. The resilient fingers bend slightly and maintain pressure against the transformer to center the transformer in the casing, to prevent the transformer from moving within the casing, and to press the input leads 34 against the lead receiving channels 42 of the terminal arms 12.

Referring to FIG. 1, the body member 16 and the lid member 18 of the casing have recesses 50 and 51, respectively, formed in their marginal edges 25 and 22, respectively. The recesses face each other and cooperate to form the opening for receiving the electrical cord 14. When the lid is snap fit over the body member, the recessed portions of said members clamp and hold the electrical cord in the opening formed by the recesses.

In assembly, the preformed terminal arms 12 are snap fit through the slots 44 in the bottom wall of the body member 16 of the casing. The pre-assembled transformer 10 (with the input leads 34 wrapped around bobbin arms 36) is then positioned within the interior cavity 16a of the body member so that the input leads are pressed into contact with the lead receiving channels 42 of the terminal arms. The electrical cord 14 has preferably been welded to the transformer prior to inserting into the casing body member 16, although it may be welded thereto after the transformer is positioned in the interior cavity 16a. The lid 18 is then snapped over the body member 16 of the casing such that the lips 24 of the body are locked in the internal grooves 20 of the lid, the resilient fingers 48 bear against the transformer to maintain constant pressure against the transformer 10 and the terminal cord is held in the opening between recesses 50 and 51.

Thus it can be seen that the entire converter is assembled without employing a single screw or like fastening means, Normally, the transformer, with the electrical cord welded thereto, is pre-assembled to form a single part prior to bringing the same to the assemblage points of the entire converter.

While this invention is susceptible of embodiment in many different forms, there is shown in the drawings and will herein be described in detail one embodiment of the invention together with a modification thereof, with the understanding that the present disclosure is to be considered as an exemplification of the principles of the invention and is not intended to limit the invention to the embodiment illustrated. The scope of the invention will be pointed out in the appended claims.

I claim:
1. An electrical converter, comprising: a casing having an interior cavity, a pair of spaced generally parallel slots therethrough, and an opening for receiving an output transferring device; a pair of input terminal arms extending through the slots in said casing from the interior thereof, each terminal arm having a lead receiving portion disposed within the interior cavity of said casing; an output transferring device in said casing opening; and a transformer fitted snugly in the interior cavity of said casing, said transformer having primary winding means including input leads held in pressed contact with the lead receiving portions of said terminal arms, and secondary winding means having output leads secured to said output transferring device.

2. The electrical converter of claim 1 wherein said casing includes a body member having an interior cavity for receiving said transformer and a lid member snap fit onto said body member.

3. An electrical device of the character described, comprising: a housing; terminal means extending through said housing; an electrical translating means fitted snugly within said housing and having input leads and output leads; and means on said housing bearing against a portion of said electrical translating means to press said input leads against said terminal means.

4. The electrical device of claim 3 wherein said housing includes a body member and a lid member snap fit onto said body member.

5. The electrical device of claim 4 wherein a portion of said lid member bears against said electrical translating means when said lid is snapped onto said body to press said input leads against said terminal means.

6. The electrical device of claim 5 including resilient means formed integrally with said lid and bearing against said electrical translating means.

7. An electrical converter, comprising: a casing having an interior cavity, a pair of spaced generally parallel slots therethrough, and an opening for receiving an output transferring device; a pair of input terminal arms extending through the slots in said casing from the interior thereof, each terminal arm having a lead receiving portion disposed within the interior cavity of said casing; an output transferring device in said casing opening; a transformer fitted snugly in the interior cavity of said casing, said transformer having primary winding means including input leads held in pressed contact with the lead receiving portions of said terminal arms, and secondary winding means having output leads secured to said output transferring device; and means formed integrally with said casing for centering said transformer in the interior cavity of the casing and for maintaining pressure against said transformer to press said input leads against the lead receiving portions of said terminal arms.

8. An electrical converter, comprising: a casing including a body member having an interior cavity and a lid member snap fit onto the body member, a pair of spaced generally parallel slots through said casing, and an opening for receiving an output transferring device; a pair of input terminal arms extending through the slots in said casing from the interior thereof, each terminal arm having a lead receiving portion disposed within the interior cavity of said casing; an output transferring device in said casing opening; a transformer fitting snugly in the interior cavity of said casing, said transformer having primary winding means includng input leads held in pressed contact with the lead receiving portions of said terminal arms, and secondary winding means having output leads secured to said output transferring device; and resilient means on said lid member engaging a portion of said transformer for maintaining pressure against said transformer to press said input leads against the lead receiving portions of said terminal arms.

References Cited

UNITED STATES PATENTS

| | | | |
|---|---|---|---|
| 2,512,796 | 6/1950 | Hartzwell | 336—92 |
| 2,619,513 | 11/1952 | Wolfenbarger | 336—92 XR |
| 2,762,019 | 9/1956 | Short et al. | 336—92 |
| 3,079,510 | 2/1963 | Wartwig | 320—2 XR |
| 3,089,071 | 5/1963 | Wartwig | 320—2 |
| 3,189,857 | 6/1965 | Jones | 336—192 XR |
| 3,255,399 | 6/1966 | Parks | 321—8 |

DARRELL L. CLAY, *Primary Examiner.*

T. J. KOZMA, *Assistant Examiner.*